(12) United States Patent
Goldberg et al.

(10) Patent No.: US 7,324,978 B2
(45) Date of Patent: Jan. 29, 2008

(54) METHOD AND APPARATUS FOR CREATING CONSISTENT RISK FORECASTS AND FOR AGGREGATING FACTOR MODELS

(75) Inventors: Lisa Robin Goldberg, Kensington, CA (US); Alec Kercheval, Tallahassee, FL (US); Guy Miller, San Francisco, CA (US)

(73) Assignee: Barra, Inc., Berkeley, CA (US)

( * ) Notice: Subject to any disclaimer, the term of this patent is extended or adjusted under 35 U.S.C. 154(b) by 371 days.

(21) Appl. No.: 10/480,020

(22) PCT Filed: Jun. 4, 2002

(86) PCT No.: PCT/US02/17924
§ 371 (c)(1),
(2), (4) Date: Jun. 7, 2004

(87) PCT Pub. No.: WO02/099684

PCT Pub. Date: Dec. 12, 2002

(65) Prior Publication Data
US 2004/0236546 A1    Nov. 25, 2004

(51) Int. Cl.
*G06F 15/18* (2006.01)
*G06Q 40/00* (2006.01)

(52) U.S. Cl. .......................................... 706/19; 705/38
(58) Field of Classification Search ............... None
See application file for complete search history.

(56) References Cited
U.S. PATENT DOCUMENTS

| | | | |
|---|---|---|---|
| 5,093,869 A | 3/1992 | Alves et al. ............... 382/22 |
| 5,761,442 A | 6/1998 | Barr et al. ................. 395/236 |
| 5,812,987 A * | 9/1998 | Luskin et al. ............. 705/36 R |
| 5,930,762 A | 7/1999 | Masch ........................... 705/7 |
| 6,219,805 B1 | 4/2001 | Jones et al. ................. 714/38 |
| 6,249,775 B1 | 6/2001 | Freeman et al. ............ 705/36 |
| 6,278,981 B1 * | 8/2001 | Dembo et al. ............ 705/36 R |
| 6,539,351 B1 * | 3/2003 | Chen et al. ................. 704/236 |

OTHER PUBLICATIONS

Computing Portfolion Risk Using Gaussian Mixtures and Independent Component Analysis. Elion Chin, Andreas S. Weigend and Heinz Zimmerman. Conference on Computational Intelligence for Financial Engineering. 1999.*
Risk Measurement with Maximum Loss. Gerold Studer. Mathematical Methods of Operations Researc. 1999.*
Quadratic Maximum Loss for Risk Measurement of Portfolios. Gerold Studer. RiskLab: Technical Report Sep. 1996.*
Zhao, Feng; Intelligent Computing About Complex Dynamical Systems; 1994.
Grunewald, B. and S. Trautmann; Option Hedging in the Presence of Jump Risk; Aug. 1996.
Peeples, D.; VISART: Risk Analysis, Confidentiality and Extending Expected Value.

* cited by examiner

*Primary Examiner*—David Vincent
*Assistant Examiner*—Adrian Kennedy
(74) *Attorney, Agent, or Firm*—Michael A. Glenn; Glenn Patent Group

(57) ABSTRACT

An invention forcing an aggregate risk model to be consistent with standalone models is provided. A revising transformation parameterized over and an objective function minimized over, the orthogonal group are provided, least changing cross blocks of covariance matrices, preserving information in original cross block correlations, consistent with a prescribed revised sub-block.

15 Claims, 2 Drawing Sheets

US 7,324,978 B2

METHOD AND APPARATUS FOR CREATING CONSISTENT RISK FORECASTS AND FOR AGGREGATING FACTOR MODELS

BACKGROUND OF THE INVENTION

1. Technical Field

The present invention relates to risk model aggregation. More particularly, the present invention relates to a method and apparatus for a mathematical technique that forces an aggregate risk model to be consistent with embedded standalone models.

2. Description of the Prior Art

My ventures are not in one bottom trusted,
Nor to one place; nor is my whole estate
Upon the fortune of this present year.
Therefore, my merchandise makes me not sad.

William Shakespeare, The Merchant of Venice (1598)

Shakespeare reminds us that the perils of investment have been with us always. Investors have long appreciated the importance of diversification. The idea took quantitative form with the work of H. Markowitz, *The Birth of Mean-Variance Optimization* (7.1, 77-91), Portfolio Selection, Journal of Finance (1952). Since then increasingly sophisticated mathematical and statistical tools have been brought to bear on the problem of estimating the aggregate risk of a portfolio.

The aggregate risk of a portfolio depends crucially on the covariances of the portfolio's constituent assets. Unfortunately, in practical situations so many covariances come into play that it is impossible to estimate all of them directly from historical data. Factor models overcome this difficulty by expressing the large number of asset covariances in terms of a small number of factor covariances.

A factor model is defined through a linear regression, as follows:

$$y = A \cdot x + \epsilon. \quad (1)$$

Here y is the vector of asset returns whose variances and covariances require estimation, x is a vector of factor returns whose variances and covariances can be reliably estimated, and A is a matrix, specified a priori, that describes the sensitivities of the assets to the factors. The vector $\epsilon$ of errors is usually assumed to be normally distributed with a diagonal covariance matrix D. This model estimates the asset covariance matrix, $\Sigma(y)$, as $$\Sigma(y) \approx A \cdot \Sigma(x) \cdot A^T + D \quad (2)$$

where $\Sigma(x)$ is the matrix of factor covariances. The dimension of the matrix $\Sigma(x)$ is small enough that historical data allow reasonable estimates of the covariances.

As quantitative risk management has become more sophisticated, factor models have become more finely detailed. At the same time, models have broadened; large models encompassing many asset classes and markets have become necessary for large firms to forecast their "total risk." Both of these trends have forced the number of factors upward to the point where, once again, more covariances are required (this time, between factors instead of assets) than can be accurately estimated.

This problem can be addressed by iterating the idea that worked before. Factor models themselves can be built up from smaller factor models. However, this approach introduces a new set of difficulties related to consistency. To illustrate the problem, imagine building a factor model to estimate risk for a portfolio composed of US equity and fixed income securities. Suppose further that there are already excellent standalone factor models that separately treat equities and fixed income securities. An aggregate factor model will almost certainly be inconsistent with the standalone factor models. The discrepancies might result from the iterated factor structure, from differences in the amount and frequency of data, from clashes in statistical methods specific to each standalone model, or from other sources. Such discrepancies are undesirable in part because they can cause different levels of a firm to have different views of the same source of investment risk.

It would be advantageous to provide a mathematical technique that enforces consistency between an aggregate model and the standalone models, i.e., to achieve breadth without sacrificing meaningful detail. More specifically, it would be advantageous to revise the aggregate risk model to be consistent with the standalone models. Unfortunately, enforcing consistency almost always involves the destruction of covariance Information in the aggregate model. The problem is to minimize the damage.

SUMMARY OF THE INVENTION

The present invention relates to a method and apparatus for a mathematical technique that forces an aggregate risk model to be consistent with embedded standalone models. More specifically, the present invention provides an optimized method and apparatus for revising submatrices, also referred to herein as subblocks, of a covariance matrix. A particular linear change of variables, called a revising transformation, is introduced whereby each diagonal submatrix corresponding to a standalone model is overwritten with a revised version. The space of revising transformations is shown to be parameterizable by a product of orthogonal groups via a particular parameterization. A revising transformation is provided that least changes the cross blocks (i.e., the off-diagonal blocks) of the covariance matrix, thereby preserving as much information in the original cross block correlations as possible, consistent with a prescribed overwriting. An objective function that quantifies the loss of cross block information is specified and minimized over the orthogonal group.

DETAILED DESCRIPTION OF THE INVENTION

Figure 1:
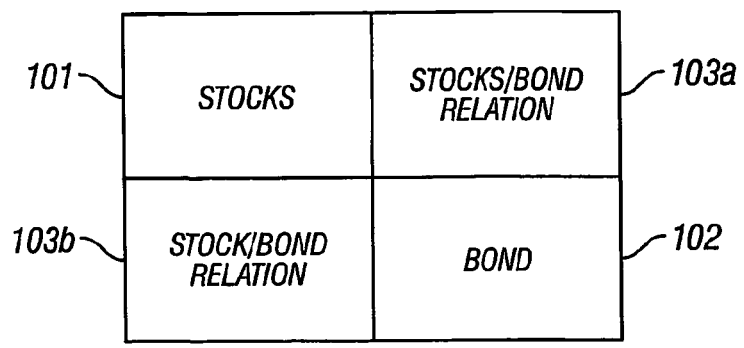
FIG. 1 is a schematic diagram of a simple matrix representation of stocks and bonds and their respective covariance matrices according to the invention.

The present invention relates to a method and apparatus for a mathematical technique that forces an aggregate risk model to be consistent with embedded standalone models. More specifically, the present invention provides an optimized method and apparatus for revising the diagonal submatrices that correspond to standalone models, so that agreement is achieved. A particular linear change of variables is introduced whereby each diagonal submatrix is overwritten with a revised version; the revision of a particular diagonal submatrix leaves the others unaffected. The space of simple revising transformations is shown to be parameterizable a product of orthogonal groups via a particular parameterization. A revising transformation is sought that least changes the cross blocks (I.e., the off-diagonal blocks) of the covariance matrix, thereby preserving as much of the original information in the cross block correlations as possible. An objective function that characterizes information loss is provided and minimized over the product of orthogonal groups.

An important part of understanding the invention is understanding the concept of an aggregate risk model and knowing some relevant definitions.

An Aggregate Risk Model and Examples

In many cases, the vector of factors underlying an aggregate risk model can be decomposed into meaningful subvectors. For example, a factor model may cover more than one market or asset type. Alternatively, statistical properties may distinguish a particular group of factors.

Definitions. An aggregate factor model is a factor model whose vector of factors f decomposes into subvectors:

$$\begin{pmatrix} f_1 \\ f_2 \\ \vdots \\ f_n \end{pmatrix}. \quad (3)$$

Let $\Sigma$ be the covariance matrix of the factors f. The decomposition in equation (3) imposes a block structure on the covariance matrix. The $i^{th}$ diagonal block $\Sigma_i$ of $\Sigma$ contains the subset of covariances between factors in the subset $f_i$. The cross-block covariances are the elements of $\Sigma$ not contained in one of the $\Sigma_i$'s.

The problem of revising an aggregate risk model to be consistent with the standalone models is illustrated below in two examples: a currency block example and a global equities model example.

A Currency Block Example

The first example arises in connection with currency risk. A substantial amount of the variation in the return of an unhedged international portfolio of investment-grade bonds is due to changes in currency exchange rates. Hence international risk models need factors to account for currency risk, as well as risk due to changes in interest rates and credit spreads. However, the statistical properties of the two types of factors are quite different. Currencies are very volatile and subject to regime changes. Risk estimates for these factors make use of recent, high frequency data. For local market factors, however, it is desirable to use lower frequency data and a model with a longer memory.

One approach to combining the models is to build a "first draft" of the aggregate model based on lower frequency data and then to embed a time-scaled currency risk block that has been estimated separately. Unfortunately, the easiest way to do this, i.e. simply overwriting the first draft of the currency block with the high frequency block, usually leads to an inconsistent covariance matrix. The inconsistency can arise in many ways. It might appear because the variance ascribed to a factor is too small to account for its large covariances with factors of another standalone model, or because it is now very strongly correlated with another factor from the same standalone model, but the off-diagonal blocks indicate the two factors behave quite differently in relation to a third factor from another standalone model. The "covariance matrix" resulting from the simple overwrite will characteristically make negative variance forecasts (or imaginary forecasts of standard deviation) for some unfortunate portfolios, and forecasts for other portfolios will be hopelessly compromised. It follows that any realistic approach to overwriting the currency block must disturb cross-block correlations.

The preferred embodiment of the invention provides a simple approach that produces consistency. It assumes that there is a linear relationship between the returns forecast by the "first draft" of the aggregate model and the returns forecast by the standalone model, and transforms from the original to the revised diagonal block following this relationship. In our example, a linear change of variables overwrites the first draft of the currency block with the high quality standalone model version. As is necessarily the case, this change of variables disturbs the cross-block correlations.

This raises the question of how small the disturbance can be made. Using a naive linear change of variables, one can faithfully embed the currency block and in so doing typically change the cross-block correlations by ±0.1. Using the optimized approach described below, the average disturbance is cut to approximately ±0.05.

A Global Equities Example

The global equities example arises in connection with a risk model for a portfolio of global equities. An example of such risk model is one currently in use at Barra Inc., Berkeley, Ca. Barra's global equity model covers 56 markets and has 1274 factors. The structural approach of "iterated factor models" mentioned above is employed. The result is a "first draft" of the risk model that avoids spurious correlations. However, it leaves a family of embedded submodels that are inconsistent with single country equity models. Here the problem is more complicated than in the previous example, since many diagonal blocks require revision simultaneously. This results in an optimization problem with over 12,000 variables, as opposed to the roughly 700 variables in the global fixed income and currency embedding problem above. Thus, the overwhelming size of the problem has led to explorations of modifications of the optimization routine, achieving nearly the same result, but with a large reduction in the number of variables. Several simplified approaches to multiple block embedding are discussed below in the Section, Multiple Block Optimization.

Optimized Single Block Embedding

One preferred embodiment of the invention optimizes embedding blocks one at a time, as if each block were the only one requiring attention. Just as in the currency/global fixed income example, the invention offers a significant improvement over unoptimized methods.

To understand this embodiment of the invention, consider a simple example for vectors $\tilde{t}$ and u, where ($\tilde{t}$) represents currency and (u) represents fixed income factors. Then let $\tilde{\Sigma}$ be the covariance matrix of such random vector, $\tilde{s}$, where $$\tilde{s} = \begin{pmatrix} \tilde{t} \\ u \end{pmatrix}$$

for vectors $\tilde{t}$ and u.

This embodiment of the invention comprises overwriting a diagonal subblock of the covariance matrix, $\tilde{\Sigma}$ without affecting other diagonals. However, cross-blocks are affected, as shown in the linear change of variables section below.

A Linear Change of Variables

Suppose that $\tilde{\Sigma}$ is a covariance matrix of a random vector $\tilde{s}$. This means that $\tilde{\Sigma}$ is symmetric and positive semi-definite. Let L be a nonsingular linear transformation satisfying $$s = L \cdot \tilde{s}. \tag{4}$$

Then the matrix $$\Sigma = L \cdot \tilde{\Sigma} \cdot L^T \tag{5}$$

is the covariance matrix of the random vector s. Consequently, $\Sigma$ is symmetric and positive semi-definite.

We decompose the vector $\tilde{s}$ of random variables into two parts:

$$\tilde{s} = \begin{pmatrix} \tilde{t} \\ u \end{pmatrix}. \tag{6}$$

This breakdown induces a block structure on the covariance matrix:

$$\tilde{\Sigma} = \begin{pmatrix} \tilde{\Theta} & C \\ C^T & Y \end{pmatrix}. \tag{7}$$

Here $\tilde{\Theta}$ and Y are the covariance matrices of the vectors $\tilde{t}$ and u respectively. The off-diagonal block C contains covariances between members of $\tilde{t}$ and members of u. Recall that an example to keep in mind is the breakdown into currency ($\tilde{t}$) and fixed income factors (u).

According to the preferred embodiment of the invention, the diagonal submatrix $\tilde{\Theta}$ can be overwritten with a revised version $\Theta$. This can be accomplished with a transformation L of the following form:

$$L = \begin{pmatrix} \Theta^{1/2} \cdot \tilde{\Theta}^{-1/2} & 0 \\ 0 & id \end{pmatrix}. \tag{8}$$

The symbol $\tilde{\Theta}^{1/2}$ denotes the symmetric square root of $\Theta$. It is the unique positive semi-definite symmetric matrix M satisfying $$M \cdot M = \Theta.$$

The symbol $\tilde{\Theta}^{-1/2}$ denotes the multiplicative inverse of $\tilde{\Theta}^{1/2}$. The matrices $\tilde{\Theta}^{1/2}$ and $\tilde{\Theta}^{-1/2}$ are guaranteed to exist, because $\Theta$ and $\tilde{\Theta}$ are symmetric positive semi-definite.

Due to the special form of the matrix L, transformation (5) preserves the block structure of $\tilde{\Sigma}$. The matrix $\tilde{\Theta}$ is replaced by $\Theta$ and Y is unchanged. The revised covariance matrix is $$\begin{pmatrix} \Theta & \Theta^{1/2} \cdot \tilde{\Theta}^{-1/2} \cdot C \\ C^T \cdot \tilde{\Theta}^{-1/2} \cdot \Theta^{1/2} & Y \end{pmatrix} \tag{9}$$

The considerations above show that by taking a linear transformation that preserves the block structure of $\tilde{\Sigma}$, a diagonal subblock can be overwritten without affecting the other diagonal subblocks. However, the cross blocks are affected.

The discussion above raises two interesting issues:
1. Can one characterize the set of linear transformations that revise only one diagonal block?
2. How small can the cross-block impact of a revising transformation be made?

These topics are addressed in the following two sections, Revising Transformations and The Optimal Revising Transformation, respectively.

Revising Transformations

As in the previous section of the aggregate factor model, let $\tilde{\Sigma}$ be a covariance matrix of $$\tilde{s} = \begin{pmatrix} \tilde{t} \\ u \end{pmatrix}. \tag{10}$$

Let $\tilde{\Theta}$ be the subblock corresponding to $\tilde{t}$, and let $\Theta$ be a revised version of $\tilde{\Theta}$. Hence, the set of linear transformations that revise only one diagonal block can be characterized by a simple revising transformation, as defined below. Furthermore, the space of simple revising transformations of such set of linear transformations can be parameterized by a particular orthogonal group, as shown in the discussion below.

The preferred embodiment of the invention introduces two more definitions.

Definition. A simple revising transformation of $(\tilde{\Sigma}; \tilde{\Theta}, \Theta)$ is a linear map L: $\tilde{s} \mapsto s$ that overwrites $\tilde{\Theta}$ by $\Theta$ in $\Sigma = L \cdot \tilde{\Sigma} \cdot L^T$ and restricts to the identity on u, so that it leaves the complementary diagonal block unchanged.

Definition. A square root of an n×n matrix $\Theta$ is an n×n matrix $\sqrt{\Theta}$ such that $$\sqrt{\Theta} \sqrt{\Theta}^T = \Theta.$$

It is a fact that a matrix $\Theta$ has a square root if and only if $\Theta$ is positive semi-definite symmetric. It is also not difficult to show that $\sqrt{\Theta}$ is a square root of such $\Theta$ if and only if $\sqrt{\Theta} = \Theta^{1/2} \cdot O$ for some orthogonal matrix O.

The preferred embodiment of the invention provides a characterization of simple revising transformations, presented below as Theorem 1 in two parts, and the corresponding proof thereof.

Theorem 1

(a) The matrix L is a simple revising transformation of $(\tilde{\Sigma}; \tilde{\Theta}, \Theta)$ if and only if $$L = \begin{pmatrix} \sqrt{\Theta} \left( \sqrt{\tilde{\Theta}} \right)^{-1} & 0 \\ 0 & id \end{pmatrix}.$$

for some choice of square roots $\sqrt{\Theta}$ and $\sqrt{\tilde{\Theta}}$.

(b) Suppose n is the dimension of $\Theta$. Then the space of simple revising transformations of $(\tilde{\Sigma}; \tilde{\Theta}, \Theta)$ is parameterized by the orthogonal group O(n) via the parameterization $$L(O) = \begin{pmatrix} \Theta^{1/2} \cdot O \cdot \tilde{\Theta}^{-1/2} & 0 \\ 0 & id \end{pmatrix}$$

for $O \epsilon O(n)$.

Proof of Theorem 1:

Direct calculation demonstrates that each such L or L(O) is a simple revising transformation of $(\tilde{\Sigma}; \tilde{\Theta}, \Theta)$.

Conversely, suppose that L is a simple revising transformation of $(\tilde{\Sigma}; \tilde{\Theta}, \Theta)$. By assumption L takes the form $$L = \begin{pmatrix} M & 0 \\ 0 & id \end{pmatrix}. \quad (11)$$

Transformation (5) implies that $$\Theta = M \cdot \tilde{\Theta} \cdot M^T. \quad (12)$$

Since $\Theta$ and $\tilde{\Theta}$ are symmetric and positive semi-definite, equation (12) can be rewritten as $$id = \Theta^{-1/2} \cdot M \cdot \tilde{\Theta}^{1/2} \cdot \tilde{\Theta}^{1/2} \cdot M^T \cdot \Theta^{-1/2} \quad (13)$$

Set $O = \Theta^{-1/2} \cdot M \cdot \tilde{\Theta}^{1/2}$. Then equation (13) becomes $$id = O \cdot O^T, \quad (14)$$

establishing that $O \epsilon O(n)$, and so L is of the form L(O). Since L is clearly one-to-one, this finishes the proof of (b).

For (a), if L is a simple revising transformation, then, by (b), L=L(O) for some $O \epsilon O(n)$, and, thus, $\sqrt{\Theta} = \Theta^{1/2} \cdot O$ and $\sqrt{\tilde{\Theta}} = \tilde{\Theta}^{1/2}$.

The Optimal Revising Transformation

To address the second question posed in the linear change of variables section, it is desirable to find a revising transformation that least changes the cross-block correlations of the covariance matrix $\tilde{\Sigma}$. Such a revising transformation preserves as much information in the original cross-block correlations as possible consistent with the prescribed sub-block $\Theta$.

A preferred embodiment of the invention treats such modeling problem numerically as a nonlinear minimization. An objective function is chosen to measure the degree of change to the cross blocks due to L. Such choice of objective function generally depends on the relative importance of the different variables. It has been found that it is reasonable to make a generic choice for this analysis, e.g., the root-mean-square change in components of the cross block due to L(O):

$$f(O) = (1/m) \| \Theta^{1/2} \cdot O \cdot \tilde{\Theta}^{-1/2} C - C \|,$$

where m is the number of elements of C, and $\| \cdot \|$ refers to the matrix norm given by the square root of the sum of the squares of the components.

It is equivalent and more convenient to minimize the function $$g(O) = m^2 f^2 = \| \Theta^{1/2} \cdot O \cdot \tilde{\Theta}^{-1/2} C - C \|^2.$$

Thus, the preferred embodiment of the invention provides the solution to the numerical problem of minimizing g over the orthogonal group O(n). It should be appreciated that although this group is disconnected, attention can be restricted to the connected component containing the Identity SO(n), the group of orthogonal matrices with determinant +1.

The form of the objective function g as a sum of squares makes it suitable to the Levenberg-Marquardt numerical method, a hybrid of Newton's method and steepest descent (see W. Press, et al, *Numerical Recipes in C++*, Cambridge, 2002). Because this method requires computation of derivatives of g with respect to the parameters in O, it is desirable to have a parameterization of SO(n) for which it is convenient to compute the partial derivatives. Such a parameterization need not be one-to-one, but should cover the whole group.

The preferred embodiment of the invention provides such a function, defined as follows:

Let $N = n(n-1)/2$ denote the dimension of SO(n). For $1 \leq i < j \leq n$, denote by $R_{i,j}(\theta)$ the rotation by angle $\theta$ in the (i,j) plane (right hand rule) in $R^n$. There are N distinct such coordinate planes. The preferred embodiment of the invention makes use of the following assertion.

Every element of SO(n) may be expressed as a product of N rotations, $$h(\theta_1, \ldots, \theta_N) = R_{1,2}(\theta_1) R_{1,3}(\theta_2) \ldots R_{1,n}(\theta_n) \ldots R_{n-1,n}(\theta_N),$$

for some angles $\theta_1, \ldots, \theta_N$.

Because it is relatively easy to compute the partial derivatives of h, the Levenberg-Marquardt minimization technique is applied to $$G = g(h(\theta_1, \ldots, \theta_N))$$

in a straightforward way. If the method converges, the result is a value $O^* \epsilon SO(n)$ at which g has at least a local minimum, and therefore a simple revising transformation $L(O^*)$ likely to be better than L(id) or another random choice.

Multiple Block Optimization

In the full problem, it is desirable to adjust all of the submodel submatrices of the first-draft covariance matrix. One approach is to simultaneously optimize a sum of all the single block objective functions. In this case, the revising transformation is a product of simple revising transformations.

This leads to the following result.

Theorem 2

(a) A revising transformation is a product of simple revising transformations.
(b) Let $n_1, \ldots, n_k$ be the dimensions of the blocks that require revision. Then the space of revising transformation is parameterized by the product of orthogonal groups, $O(n_1) \times \ldots \times O(n_k)$, via the parameterization $$L(O_1, \ldots, O_k) = \begin{bmatrix} \Theta_1^{1/2} O_1 \tilde{\Theta}_1^{-1/2} & & 0 \\ & \ddots & \\ 0 & & \Theta_k^{1/2} O_k \tilde{\Theta}_k^{-1/2} \end{bmatrix}.$$

In practice the dimension of the product of orthogonals may be too large to be viably searched by our algorithm. Consequently, we explore approaches that reduce the dimensionality of the problem.

A preferred approach is to solve a sequence of single block problems, one problem for each submodel.

FIG. 1 is a schematic diagram of a simple matrix representation of stocks 101 and bonds 102 and their respective covariance matrices 103a and 103b, showing their relationship.

Figure 2:
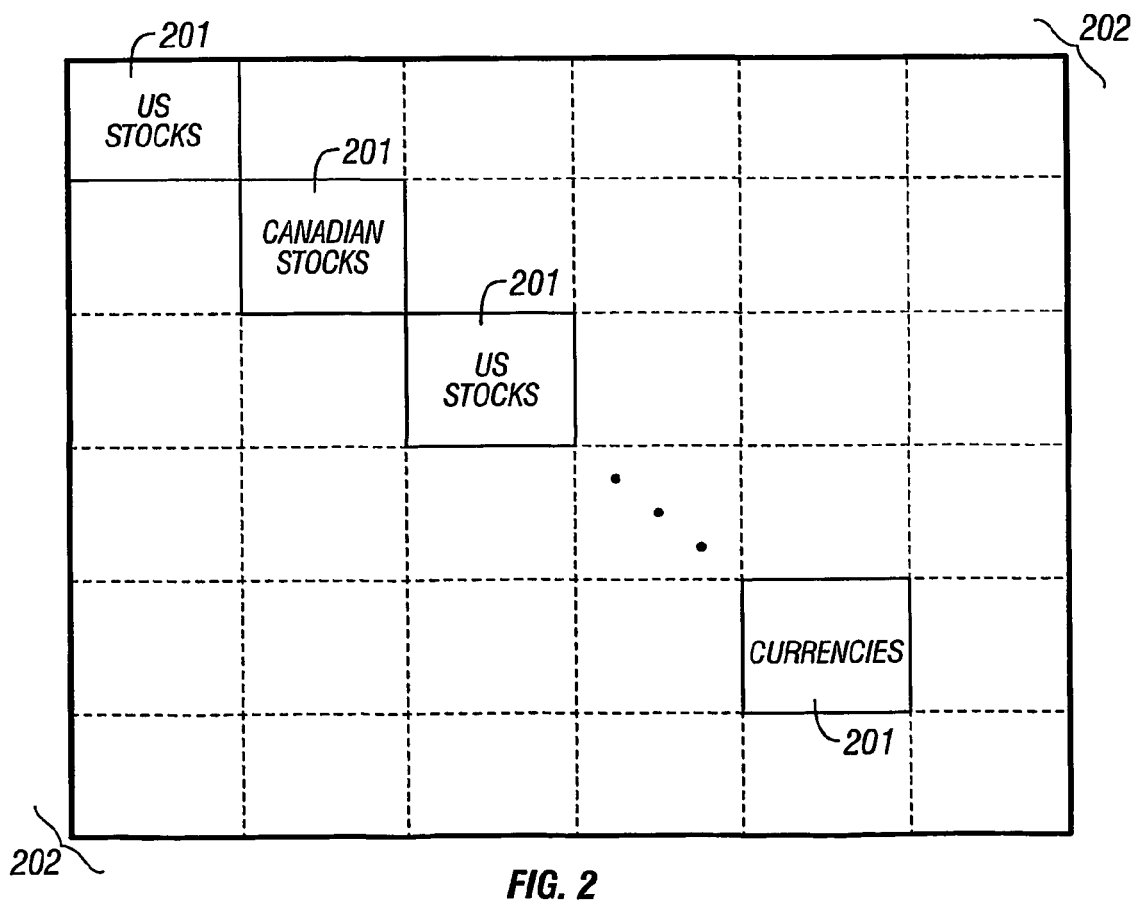
FIG. 2 is a larger schematic diagram of a simplified depiction of numerous constituent assets and their respective covariance matrices according to the invention.

FIG. 2 is a larger schematic diagram of a simplified depiction of numerous constituent assets 201 and their respective covariance matrices 202.

Figure 3:
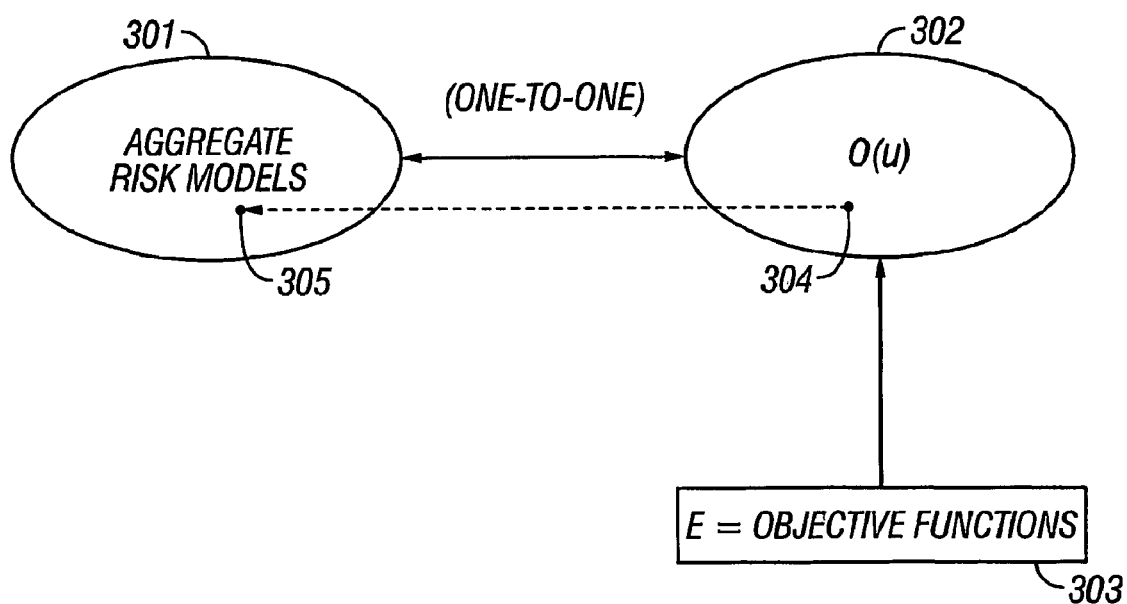
FIG. 3 is a schematic diagram of a one-to-one mapping of the space of possible aggregate risk models that are consistent with standalone models 301 to the product of orthogonal groups 302 and flexible objective functions 303 used in the optimization process according to the invention.

FIG. 3 is a schematic diagram of a one-to-one mapping of the space of possible aggregate risk models that are consistent with standalones models 301 to the product of orthogonal groups 302 and flexible objective functions 303 used in the optimization process according to the invention. It should be appreciated that the choice of objective functions is flexible, not cast in stone. The objective function serves as a rating or scoring of how well the terms in the cross blocks, i.e. the cross information, the interactions, are preserved in the optimization process. FIG. 3 shows a mock example of a point in the product of orthogonal groups 304 that is the best point according to the applied objective function 303 being mapped back to a point in the space of all possible aggregate risk models consistent with standalone models 305.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for revising an aggregate risk model for a portfolio of investments to be consistent with embedded standalone models, said method comprising:
    providing a space of possible aggregate risk models wherein each of said aggregate risk models is consistent with standalone models;
    representing said each aggregate risk model in said space as a point in a product of orthogonal groups;
    providing a machine-readable medium having stored thereon data representing sequences of instructions, the sequences of instructions which, when executed by a processor, cause the processor to perform the step of searching said product of orthogonal groups for a best representative point using a predetermined objective function; and
    obtaining said revised aggregate risk model consistent with standalone models by mapping said best representative point in said product of orthogonal groups back to a corresponding point in said aggregate risk model space.

2. The method of claim 1, wherein best means cross blocks are minimally affected.

3. The method of claim 1, wherein said predetermined objective function is flexibly chosen according to the desire of a user.

4. A machine-readable medium having stored thereon data representing sequences of instructions for revising an aggregate risk model for a portfolio of investments to be consistent with embedded standalone models, the sequences of instructions which, when executed by a processor, cause the processor to perform the steps of:
    determining a space of possible aggregate risk models wherein each of said aggregate risk models is consistent with standalone models;
    determining a representation of said each aggregate risk model in said space as a point in a product of orthogonal groups;
    searching said product of orthogonal groups for a best representative point using a predetermined objective function; and
    determining said revised aggregate risk model consistent with embedded standalone models by mapping said best representative point in said product of orthogonal groups back to a corresponding point in said aggregate risk model space.

5. The machine-readable medium of claim 4, wherein best means cross blocks are minimally affected.

6. A machine-readable medium having stored thereon data representing sequences of instructions, the sequences of instructions which, when executed by a processor to parameterize by an orthogonal group O(n) a space of simple revising transformations $(\tilde{\Sigma}; \tilde{\Theta},\Theta)$, each simple revising transformation representing a risk model for a portfolio of investments, via a parameterization $$L(O) = \begin{pmatrix} \Theta^{1/2} \cdot O \cdot \tilde{\Theta}^{-1/2} & 0 \\ 0 & id \end{pmatrix}$$

for $O \in O(n)$, cause the processor to perform the steps of:
    letting a matrix L denote a simple revising transformation of said $(\tilde{\Sigma}; \tilde{\Theta},\Theta)$ if and only if $$L = \begin{pmatrix} \sqrt{\Theta}(\sqrt{\tilde{\Theta}})^{-1} & 0 \\ 0 & id \end{pmatrix}$$

for some choice of square roots $\sqrt{\Theta}$ and $\sqrt{\tilde{\Theta}}$;
    letting n denote the dimension of $\Theta$;
    directly calculating to demonstrate that each such L or L(O) is a simple revising transformation of $(\tilde{\Sigma}; \tilde{\Theta},\Theta)$;
    conversely, letting L denote a simple revising transformation of $(\tilde{\Sigma}; \tilde{\Theta},\Theta)$, wherein, by assumption L takes the form $$L = \begin{pmatrix} M & 0 \\ 0 & id \end{pmatrix};$$

and wherein $\Sigma = L \cdot \tilde{\Sigma} \cdot L^T$ implies that $\Theta = M \cdot \tilde{\Theta} \cdot M^T$;
    since $\Theta$ and $\tilde{\Theta}$ are symmetric and positive semi-definite, rewriting $\Theta = M \cdot \tilde{\Theta} \cdot M^T$ as $id = \Theta^{-1/2} \cdot M \cdot \tilde{\Theta}^{1/2} \cdot \tilde{\Theta}^{1/2} \cdot M^T \cdot \Theta^{-1/2}$;
    setting $O = \Theta^{-1/2} \cdot M \cdot \tilde{\Theta}^{1/2}$;
    letting $id = \Theta^{-1/2} \cdot M \cdot \tilde{\Theta}^{1/2} \cdot \tilde{\Theta}^{1/2} \cdot M^T \cdot \Theta^{-1/2}$ become $id = O \cdot O^T$, thereby establishing that $O \in O(n)$, and so L is of the form L(O), and wherein L is clearly one-to-one.

7. The method of claim 6, further comprising:
    characterizing simple revising transformations, said transformations revising only one diagonal block of a covariance matrix of an aggregate model by:
    letting a matrix L denote a simple revising transformation of $(\tilde{\Sigma}; \tilde{\Theta},\Theta)$ if and only if $$L = \begin{pmatrix} \sqrt{\Theta}(\sqrt{\tilde{\Theta}})^{-1} & 0 \\ 0 & id \end{pmatrix}$$

for some choice of square roots $\sqrt{\Theta}$ and $\sqrt{\tilde{\Theta}}$; and
    letting L=L(O) for some $O \in O(n)$, and, thus, $\sqrt{\Theta} = \Theta^{1/2} \cdot O$ and $\sqrt{\tilde{\Theta}} = \tilde{\Theta}^{1/2}$.

8. The method of claim 6, further comprising, for revising a plurality of subblocks of a covariance matrix:

letting a revising transformation of a space of revising transformations be a product of said simple revising transformations, wherein $n_1, \ldots, n_k$ denote the dimensions of said subblocks requiring revision; and parameterizing said space of said revising transformations by a product of orthogonal groups, $O(n_1) \times \ldots \times O(n_k)$ via the parameterization $$L(O_1, \ldots, O_k) = \begin{bmatrix} \Theta_1^{1/2} O_1 \tilde{\Theta}_1^{-1/2} & & 0 \\ & \ddots & \\ 0 & & \Theta_k^{1/2} O_k \tilde{\Theta}_k^{-1/2} \end{bmatrix}.$$

9. A machine-readable medium having stored thereon data representing sequences of instructions for determining a revising transformation, representing a risk model for a portfolio of investments, that least changes the cross-blocks of a covariance matrix $\tilde{\Sigma}$ of an aggregate risk model, wherein said revising transformation preserves as much information in original cross block correlations as possible consistent with a prescribed subblock $\Theta$, the sequences of instructions which, when executed by a processor, cause the processor to perform the steps of:

choosing an objective function $f(O)=(1/m)\|\Theta^{1/2} \cdot O \cdot \tilde{\Theta}^{-1/2} C - C\|$, where m is the number of elements of C, and $\|$ refers to the matrix norm given by the square root of the sum of the squares of the components;

minimizing an equivalent and more convenient function $g(O)=m^2 f^2=\|\Theta^{1/2} \cdot O \cdot \tilde{\Theta}^{-1/2} C - C\|^2$;

restricting attention to the connected component of orthogonal group $O(n)$, $SO(n)$ containing the Identity, wherein $SO(n)$ is the group of orthogonal matrices with determinant $+1$;

letting $N=n(n-1)/2$ denote the dimension of $SO(n)$;

for $1 \leq i < j \leq n$, denoting by $R_{i,j}(\theta)$ the rotation by angle $\theta$ in the $(i,j)$ plane right hand rule in $R^n$; wherein there are N distinct such coordinate planes;

expressing every element of $SO(n)$ as a product of N rotations, $h(\theta_1, \ldots, \theta_N) \equiv R_{1,2}(\theta_1) R_{1,3}(\theta_2) \ldots R_{1,n}(\theta_n) \ldots R_{n-1,n}(\theta_N)$ for some angles $\theta_1, \ldots, \theta_N$; and applying a minimization technique to $G=g(h(\theta_1, \ldots, \theta_N))$; whereby if the method converges, the result is a value $O^* \in SO(n)$ at which g has at least a local minimum, and therefore a simple revising transformation $L(O^*)$ likely to be better than $L(\text{id})$ or another random choice; and if the method does not converge, then the processor stops executing the sequences of instructions.

10. A system for creating consistent risk models and aggregate factor models, said system comprising:

an input device operable to allow entering and/or transferring input data to a processor, said input data representing a first transformation, said first transformation representing a risk model for a portfolio of investments;

an output device for displaying human readable results of manipulation of said input data;

communications buses between said input device and said processor and said output device and said processor, respectively;

said processor comprising a memory, wherein said memory stores a program for parameterizing by an orthogonal group $O(n)$ a space of simple revising transformations $(\tilde{\Sigma}; \tilde{\Theta}, \Theta)$ via a parameterization $$L(O) = \begin{pmatrix} \Theta^{1/2} \cdot O \cdot \tilde{\Theta}^{-1/2} & 0 \\ 0 & id \end{pmatrix}$$

for $O \in O(n)$, said program performing a sequence of instructions, the sequences of instructions, which, when executed by said processor, cause the processor, using said input data representing said first transformation, said first transformation representing said risk model for a portfolio of investments, to perform the step of searching over the orthogonal group to find a revising transformation that minimally disturbs off-diagonal blocks; and means for displaying said revised transformation on said output device.

11. The system of claim 10, said sequences of instructions further comprising the step of:

searching over a product of orthogonal groups to find the revising transformation that minimally disturbs off-diagonal blocks.

12. The system of claim 10, wherein said input data and said output results are in matrix format.

13. A method for creating consistent risk models and aggregate factor models, said method comprising:

providing an input device operable to allow entering and/or transferring input data to a processor, said input data representing a first transformation, said first transformation representing a risk model for a portfolio of investments;

providing an output device for displaying human readable results of manipulation of said input data;

providing communications buses between said input device and said processor and said output device and said processor, respectively;

providing a memory in said processor, wherein said memory stores a program for parameterizing by an orthogonal group $O(n)$ a space of simple revising transformations $(\tilde{\Sigma}; \tilde{\Theta}, \Theta)$ via a parameterization $$L(O) = \begin{pmatrix} \Theta^{1/2} \cdot O \cdot \tilde{\Theta}^{-1/2} & 0 \\ 0 & id \end{pmatrix}$$

for $O \in O(n)$, said program performing a sequence of instructions, the sequences of instructions, which, when executed by said processor, cause the processor, using said input data representing said first transformation, said first transformation representing said risk model for a portfolio of investments, to perform the step of searching over the orthogonal group to find a revising transformation that minimally disturbs off-diagonal blocks; and means for displaying said revised transformation on said output device.

14. The method of claim 13, said sequences of instructions further comprising the step of:

searching over a product of orthogonal groups to find the revising transformation that minimally disturbs off-diagonal blocks.

15. The method of claim 13, wherein said input data and said output results are in matrix format.

* * * * *